United States Patent [19]

Manz

[11] Patent Number: 4,971,615
[45] Date of Patent: Nov. 20, 1990

[54] METHOD AND MEANS FOR PRODUCING MINERAL WOOL

[75] Inventor: Oscar E. Manz, Grand Forks, N. Dak.

[73] Assignee: UND-SEM Foundation, Grand Forks, N. Dak.

[21] Appl. No.: 439,610

[22] Filed: Nov. 20, 1989

[51] Int. Cl.⁵ .............................................. C03B 37/06
[52] U.S. Cl. .............................................. 65/5; 65/16; 65/19; 65/326; 65/355; 285/41
[58] Field of Search ...................... 65/5, 8, 15, 16, 19, 65/355, 326; 285/41

[56] References Cited

U.S. PATENT DOCUMENTS

| | | | |
|---|---|---|---|
| 1,008,204 | 11/1911 | Seghers | 65/19 |
| 1,963,763 | 6/1934 | Smith | 65/326 X |
| 3,285,720 | 11/1966 | Drummond | 65/2 X |
| 3,360,592 | 12/1967 | Rau et al. | 65/19 X |
| 4,153,655 | 5/1979 | Minnick et al. | 264/8 |
| 4,161,647 | 7/1979 | Carbonnel | 285/41 X |
| 4,259,271 | 3/1981 | Minnick et al. | 264/8 |
| 4,365,984 | 12/1982 | Gee | 65/2 |
| 4,486,211 | 12/1984 | Monaghan | 65/1 |
| 4,715,877 | 12/1987 | Moisala et al. | 65/19 X |

OTHER PUBLICATIONS

"Utilization of Industrial Wastes-An Economic Opportunity", Mir Akbar Ali; Ind. Waste Proc. Mid-Atl. Conf., 14th 1982, pp. 468-477.
"Production of Mineral Wool Insulating Fibers From Coal Ash Slag & Other Coal Derived Mat'ls", Humphreys & Lawrence; Proc. 2nd Min. Waste Util. Sym., pp. 43-52.
"Mineral Insulation-A Critical Study"; A. A. Winer & S. B. Wang.
"Utilization of By Products from Western U.S. Lignite Coal Combustion in the Mfg. of Mineral Wool", Manz. Ash: A Valuable Resource-Practoria, So. Africa, Feb.'87, "Mineral Fiber" Brochure; Mineral Fibre Intnl., Ltd.

Primary Examiner—Robert L. Lindsay
Attorney, Agent, or Firm—Zarley, McKee, Thomte, Voorhees & Sease

[57] ABSTRACT

A method and means for producing mineral wool from coal slag is described wherein molten coal slag is transferred from a coal slag tank in an electrical generation plant. The molten coal slag is transferred to a fiberization apparatus and is heated during the transfer process to maintain the coal slag in a molten state. In the fiberization apparatus, the molten coal slag is subjected to compressed air streams which creates mineral wool fibers which are collected in a collection apparatus.

2 Claims, 4 Drawing Sheets

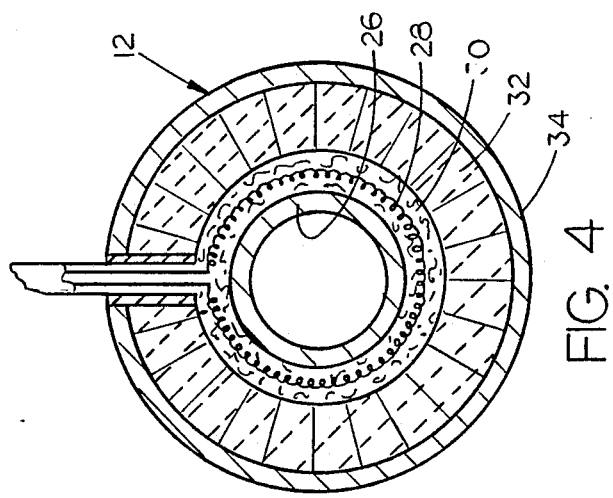
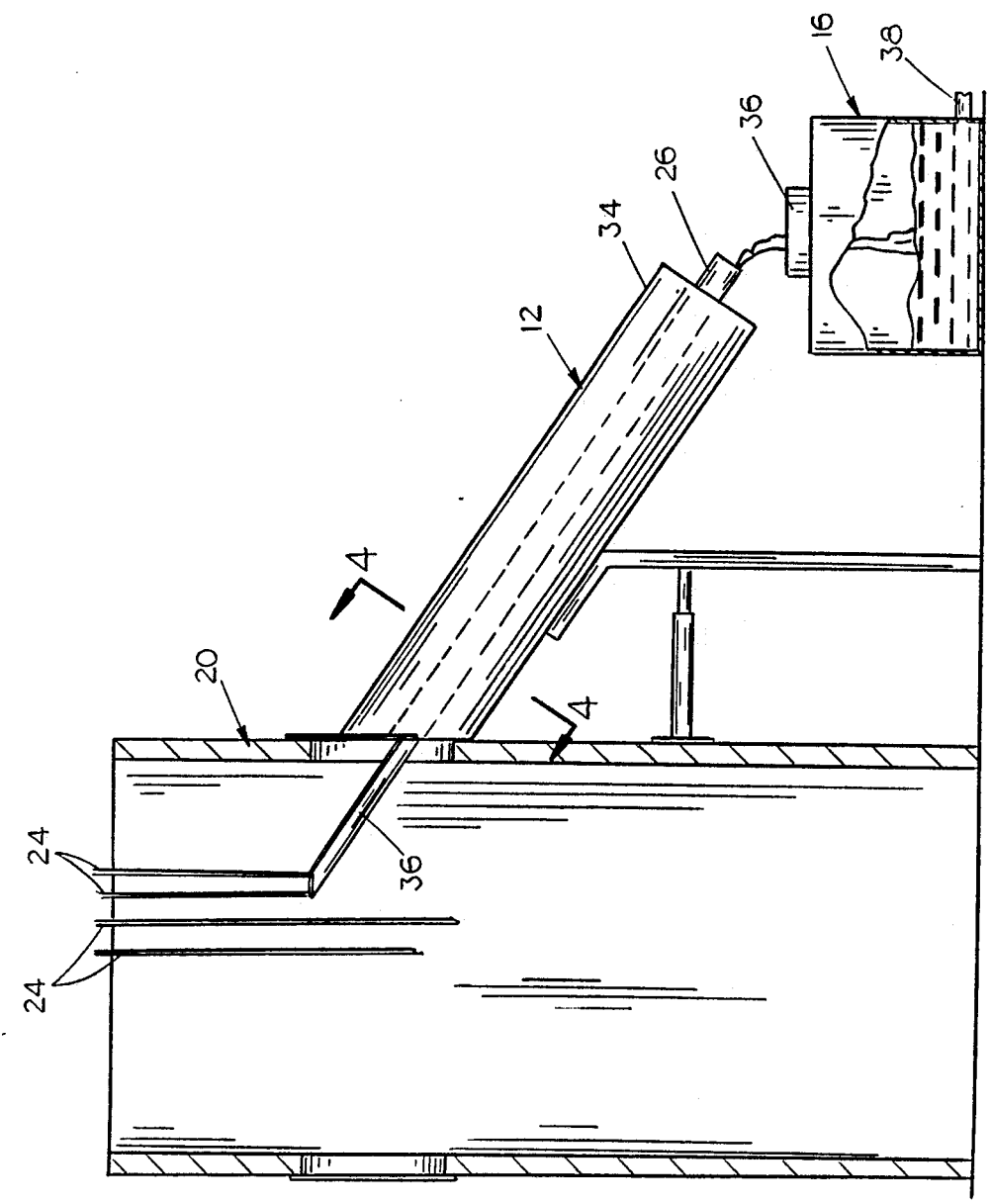

METHOD AND MEANS FOR PRODUCING MINERAL WOOL

BACKGROUND OF THE INVENTION

Mineral wool is a fibrous material normally made from molten rock or slag with its main use being as an insulating material. Mineral wool may be produced from many different raw materials. In the United States, mineral wool is normally produced from copper or steel mill slag. It has been discovered that mineral wool may also be produced from coal slag due to its similar chemical nature to copper and steel mill slag.

Slag is one of the by-products from the combustion of coal in cyclone boilers used to generate electric power. In the cyclone boilers, the molten slag settles at the bottom of the boiler in a pool, drops into a slag tank, and then drops approximately ten feet into water. When the slag hits the cooling water, it is solidified instantly and slurried out of the plant. Prior to this invention, there was no use for the slag and the slag was dumped as waste.

It is therefore a principal object of the invention to provide a method and means for producing mineral wool from coal slag.

A further object of the invention is to provide a method and means for producing mineral wool from coal slag wherein the coal slag is removed from the slag tank and is maintained at a sufficient temperature so as to remain in the molten state so as to permit the fiberization of the slag into mineral wool fibers.

Still another object of the invention is to provide a means for collecting and transferring coal slag from a slag tank in a cyclone boiler so that the coal slag may be formed into mineral wool fibers.

These and other objects will be apparent to those skilled in the art.

BRIEF DESCRIPTION OF THE DRAWINGS

FIG. 3 is a sectional view illustrating the interior of the slag tank and its relationship to the slag transfer device:

FIG. 4 is an enlarged sectional view seen on lines 4—4 of FIG. 3; and

SUMMARY OF THE INVENTION

Figure 1:
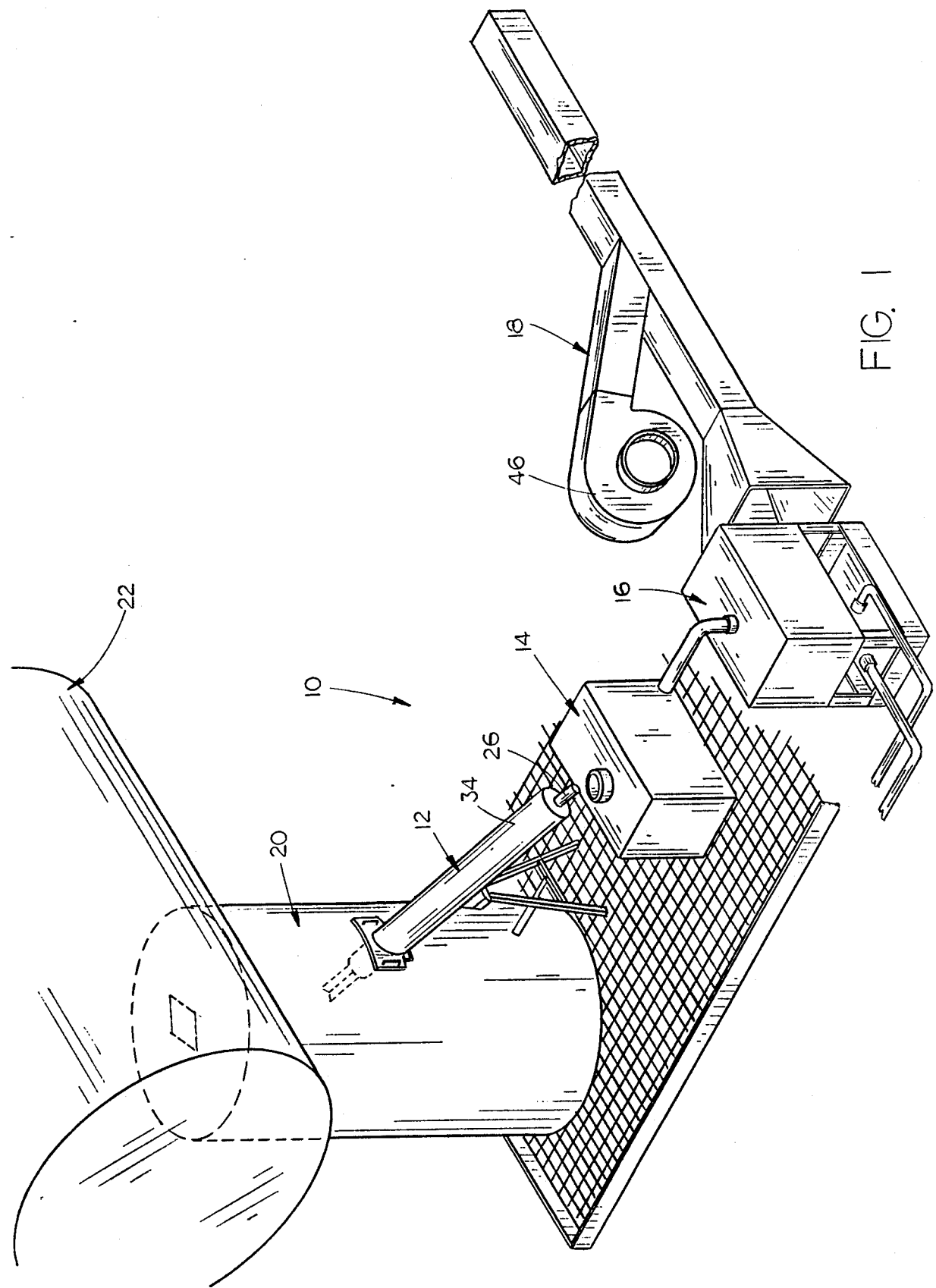
FIG. 1 is a perspective view illustrating the apparatus of this invention.
Figure 2:
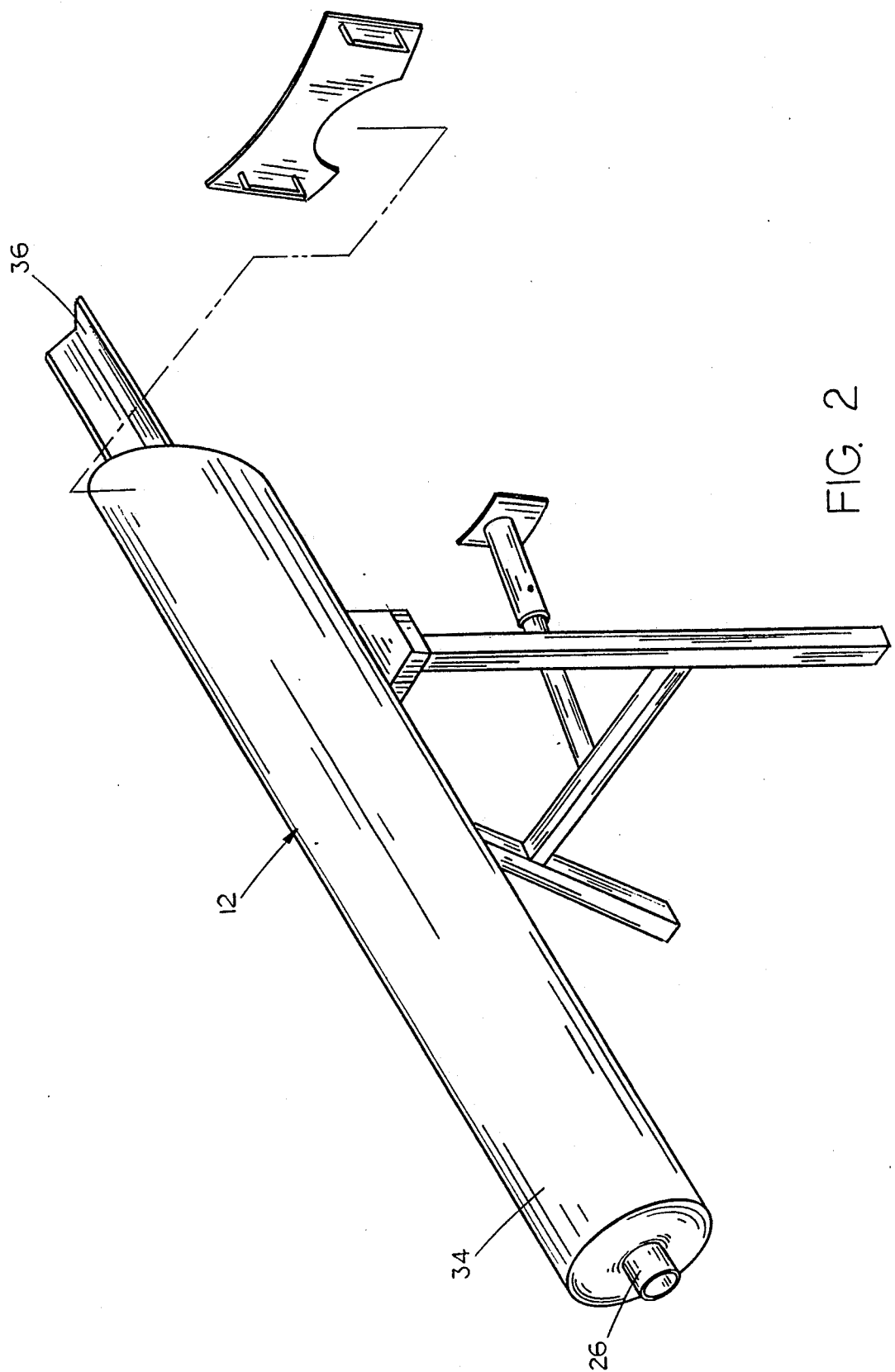
FIG. 2 is a perspective view illustrating the slag transfer device.
Figure 5:
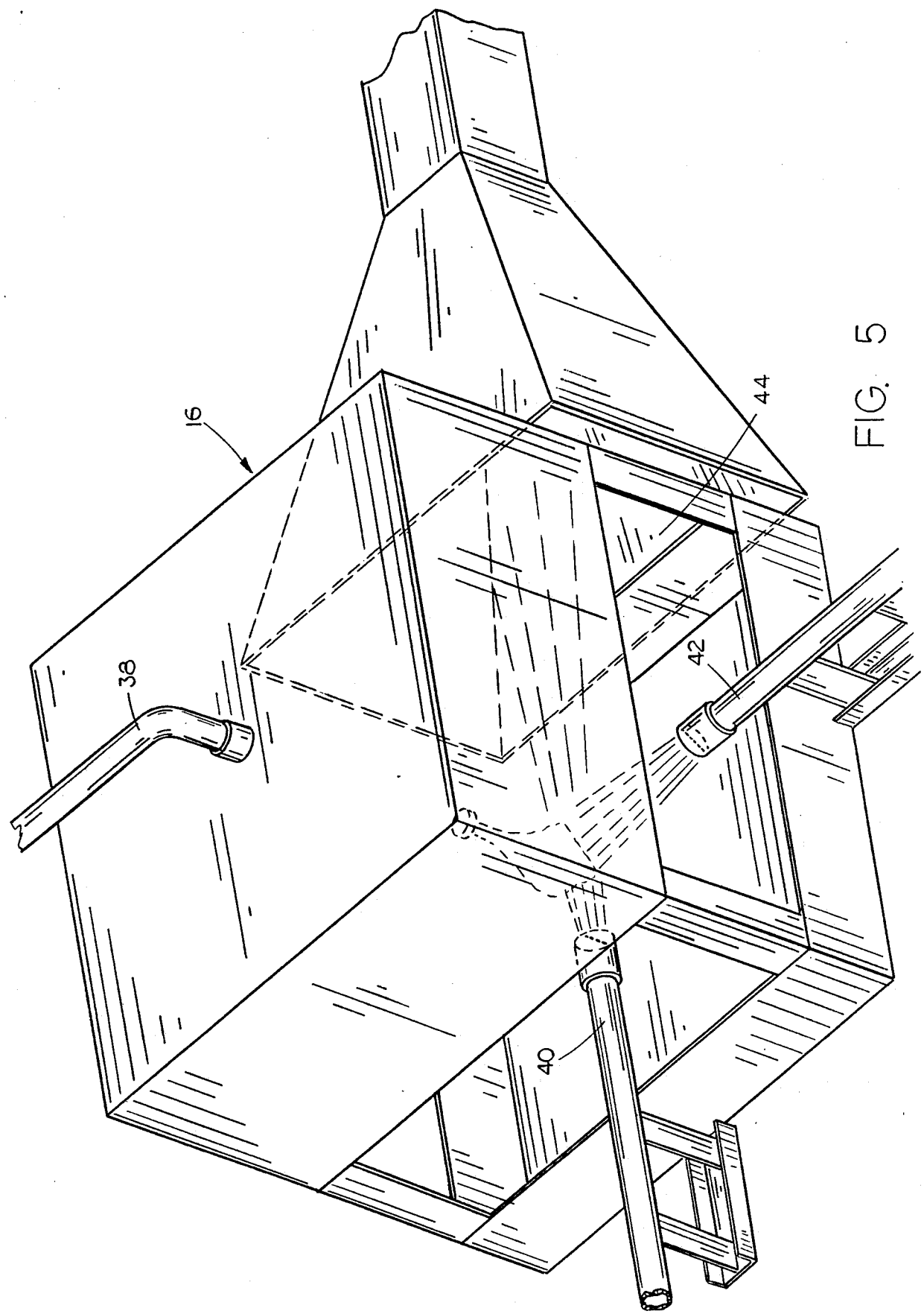
FIG. 5 is a perspective view illustrating the manner in which the molten slag is fiberized into mineral wool fibers.

In states such as North Dakota where large amounts of coal are present, electricity is generated by combusting the coal. Slag is one of the by-products from the combustion of coal in cyclone boilers. In the instant invention, the molten slag is transferred from the slag tank, is heated and is supplied to a fiberization apparatus for collection and use. The slag transfer device comprises an elongated tube having an upper end in communication with the interior of the slag tank. As the slag passes downwardly through the heat transfer device, heat is applied thereto to maintain the slag in the molten state. The slag is deposited into an additional heater which supplies the same to the fiberization mechanism.

DESCRIPTION OF THE PREFERRED EMBODIMENT

The mineral wool producing apparatus of this invention is referred to generally by the reference numeral 10 and includes a slag transfer device 12, slag heater 14, fiberizing apparatus 16, and a fiber collection apparatus 18. Apparatus 10 is designed to be used in combination with a conventional slag tank 20, the upper end of which is in communication with a conventional cyclone boiler 22 employed in a coal-fired electrical generating plant. The molten slag streams 24 drip from the boiler 22 downwardly into the slag tank 20 where the slag would normally come into contact with cooling water to solidify the same for removal from the slag tank for disposal.

Slag transfer device 12 includes an inclined and elongated inner pipe 26 surrounded by electrical heating coils 28 which are embedded in insulation material 30. An insulating K-brick material 32 surrounds the insulation material 32 with outer pipe 34 extending around insulation material 32. Collection trough 36 extends upwardly from the upper end of inner pipe 26 for collecting a portion of the molten slag which is flowing downwardly in slag tank 20 and for directing the same to inner pipe 26. The molten slag is heated by the electrical coils 28 as the molten slag passes downwardly through pipe 26 with the insulation material 30 and the K-brick material 32 preventing heat loss therefrom. The slag is the slag tank is normally about 2700° F. and the transfer device is designed to prevent the temperature of the slag from dropping to a temperature wherein it would solidify.

The molten slag is discharged from the lower end of slag transfer device 12 into the inlet 36 of slag heater 14 which may be either gas-fired or electrically heated to further heat the molten slag to prevent the temperature of the slag from dropping to a temperature wherein it would solidify.

The slag is discharged from the slag outlet 38 of slag heater 16 into the fiberizing apparatus 16 which includes compressed air lines 40 and 42 which direct compressed air into the stream of falling or downwardly passing slag to create fibers of "mineral wool" which are sucked into the inlet 44 of the fiber collection apparatus 18. Fiber collection apparatus 18 includes a blower 46 which not only creates a suction at 44 to draw the mineral wool fibers thereinto but which also blows the fibers to a suitable receptacle for transfer to storage.

Thus it can be seen that a unique method and means has been provided for producing mineral wool from otherwise useless coal slag.

I claim:
1. In combination,
   a slag tank having upper and lower ends with its upper end being in communication with a coil combustion boiler which supplies molten slag into the upper end thereof;
   an elongated inclined slag transfer device having upper and lower ends;
   said slag transfer device comprising an elongated hollow pipe means having its upper end in communication with the interior of said slag tank; means on the upper end of said pipe means for collecting a portion of the molten slag dropping downwardly through said slag tank whereby the molten slag will pass downwardly through said pipe means and outwardly of said slag tank; and means for heating said pipe means for preventing the molten slag passing therethrough from hardening as it passes therethrough;

a slag heater means having a slag inlet and a slag outlet, said slag inlet being in communication with the lower end of said pipe means for receiving the molten slag discharging from the lower end of said pipe means for heating the same as it passes therethrough;

a fiberizing apparatus having an upper inlet end which is in communication with said slag outlet of said slag heater means and an outlet end positioned below said inlet end and adapted to receive the molten slag passing downwardly from said upper inlet end, said fiberizing apparatus including means for directing air under pressure into the molten slag to fiberize the molten slag as it passes from said upper inlet end to said outlet end;

and a collection system for collecting the fibers formed in said fiberizing apparatus.

2. The method of producing mineral wool from molten coal slag flowing downwardly in a coal slag tank, comprising the steps of:

collecting a portion of the molten slag which is flowing down in the slag tank;

directing the collected slag into an elongated, inclined and heated pipe means;

heating the collected slag as it passes through said pipe means;

directing the heated slag into a slag heater which further heats the slag;

passing the heated slag from said slag heater into a fiberizing apparatus;

fiberizing the slag into mineral wools; and collecting the mineral wool fibers.

* * * * *